Jan. 28, 1930. L. O. BEARD 1,744,734
TOOL FOR REFACING VALVES
Filed Feb. 20, 1928
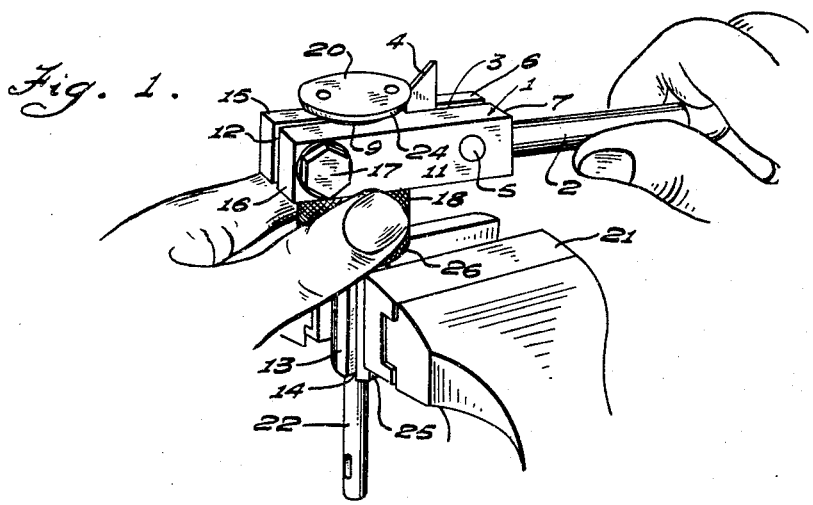
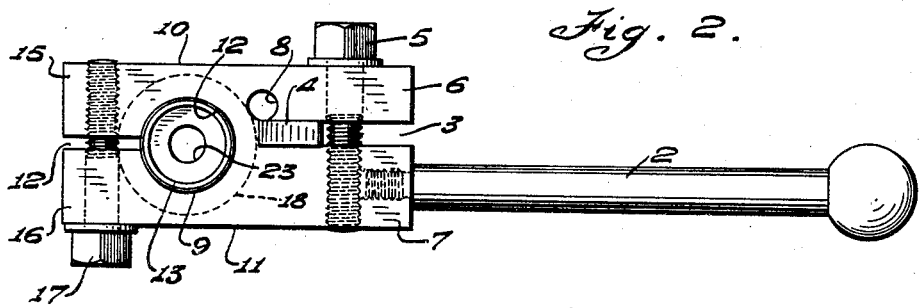
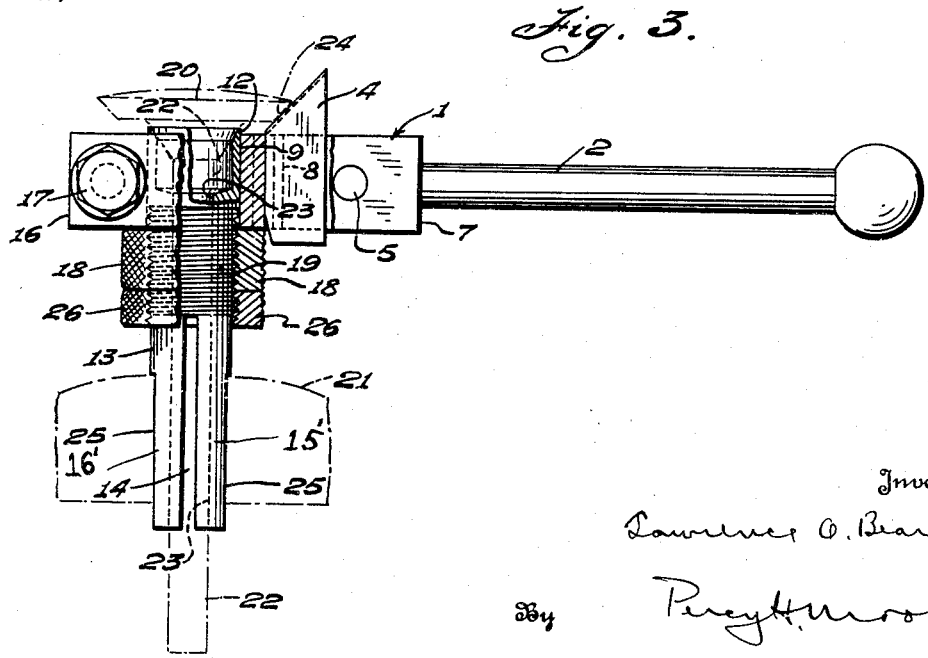
Inventor
Lawrence O. Beard
By Percy H. Moore
Attorney Patented Jan. 28, 1930

1,744,734

UNITED STATES PATENT OFFICE

LAWRENCE O. BEARD, OF LANCASTER, PENNSYLVANIA

TOOL FOR REFACING VALVES

Application filed February 20, 1928. Serial No. 255,793.

My invention relates to new and useful improvements in tools for refacing valves and more particularly internal combustion engine valves.

The object of the invention is to provide simple and efficient means for feeding the cutter to the valve, thus overcoming the tendency of the cutter to "dig in" where the valve is fed under pressure to the cutter.

Another object of the invention is to provide means for readily holding the valve stem stationary during the cutter feeding operation and the grinding or cutting operations.

Another object of the invention is to provide a valve stem holding means which will prevent marring of the stem due to continual clamping in a vise, and which will compensate for inequalities in the stem, thus conforming the valve face to the average curvature or condition of the stem. A still further object of the invention is to provide efficient means for clamping the body of the tool to the valve stem holder or chuck and also for clamping the cutter in the tool body.

With the above mentioned and other ends in view, the invention consists in the novel construction, arrangement and combination of parts, hereinafter described, illustrated in one of its embodiments in the accompanying drawings, and particularly pointed out in the appended claim.

Referring to the drawings, forming a part of this specification:

Figure 1 is a side elevation of the improved tool having its parts assembled for and equipped with an ordinary valve head and stem for use as a valve refacing tool.

Figure 2 is a plan view of the cutter head with cutter and chuck clamped therein; and Figure 3 is a side view of the cutter head and the chuck partly in section showing valve and vise in chain dotted lines.

Similar numerals of reference designate like parts throughout all the figures of the drawings.

The improved tool comprises a preferably rectangular cutter head 1, to one end of which is attached a handle 2. This end is also formed with a vertically disposed slot 3 in which is adjustably seated a cutter blade 4, a bolt 5 screwing transversely through the bifurcations 6 and 7 formed by the slot 3, serving to tightly clamp the cutter blade in place. When the bolt 5 is screwed home, the bifurcation 6 which is slightly resilient is sprung toward the bifurcation 7, thus effectively locking the cutter against movement in a vertical direction or outwardly through the slot. This resilient clamping action is augmented by cutting away the inner face of the inner end of the bifurcation 6, thus forming a small vertically disposed cavity or recess 8 in communication with the slot 3.

The cutter head is formed with a bore 9, midway between the sides 10 and 11, and a vertically disposed slot 12 terminating in said bore and also positioned midway the sides of the cutter thus forming bifurcations 15 and 16. This bore 9 is adapted to snugly receive the upper smooth end 12 of a tubular chuck 13, the lower end of which is slotted as at 14, thus forming bifurcations 15' and 16'. When the upper end of the chuck has been inserted within the bore 9, the bolt 17, extending transversely through the ends of the bifurcations 15 and 16, is tightened thus drawing the latter together to resiliently but movably clamp the chuck to the cutter head. A nut 18 is threadedly mounted on the threaded portion 19 of the chuck for a purpose presently described.

When it is desired to reface a worn valve, such as the valve 20, illustrated in Figure 1 of the drawings, the lower end of the chuck 13 is loosely clamped in a suitable vise 21 and the valve stem 22 inserted down through the chuck bore 23 until the face 24 of the valve rests upon the cutter blade 4. The vise is then tightened to immovably clamp the bifurcations 15' and 16' of the chuck to the valve stem and also hold these parts against rotary or other movement with respect to the vise jaws, the flattened faces 25 of the chuck serving to facilitate the clamping action. After the tool has been secured in the vise, the operator rotates the cutter head in an anti-clockwise direction by means of the handle 2 which is grasped in the right hand. This rotary movement of the cutter head is possible due to the fact that the latter, although frictionally clamped upon the smooth upper end of the chuck, it is not so tightly secured as to prevent relative rotary movement of these parts. As the cutter head is rotated by the right hand of the operator the nut 18 is gradually turned by the left hand in a clockwise direction, thus causing the nut to ride upwardly on the threaded portion 19 of the chuck, and to engage and correspondingly elevate the cutter head relatively to the smooth upper end of the chuck, as the valve face is cut away. It will of course be understood that during the operations just described the valve and chuck will be held by the vise against joint or independent movement. Rotation of the lock nut 26, with the nut 18 serves to lock the latter against accidental counter clockwise movement when movement of the cutter head is reversed.

From the foregoing it will be seen that the cutter blade is gradually fed or forced against the face of the valve while the latter is held stationary thus avoiding the "digging in" of the cutter blade frequently encountered in single blade tools where the valve is fed to the cutter.

It will also be noted that the jaws of the vise 21 do not engage the valve stem direct and consequently there is no danger of marring the valve stem when the tool is clamped in the vise. Should the valve stem become bent or otherwise appreciably damaged this fact would be discovered when inserting the stem in the chuck.

Having thus described one of the embodiments of my invention, without having attempted to set forth all the forms in which it may be made, or all the modes of its use, what I claim and desire to secure by Letters Patent, is:

In a valve refacing tool, a cutter head having a substantially centrally disposed circular opening therethrough, said cutter head being formed with a slot at each end thereof, one of said slots communicating with said circular opening, a cutter blade mounted in the other slot, a chuck having a smooth upper end movably inserted in said opening, said chuck adapted to receive therein a valve stem, said chuck having a threaded portion adjacent said smooth upper end, and a nut on said threaded portion for causing said cutter head to rise on said smooth portion whereby said cutter blade will be fed against the valve face, means for rotating said cutter head with respect to said chuck, means for partially closing one of said slots to clamp the valve stem and chuck therein and means for partially closing the other of said slots to clamp the cutter blade therein.

In testimony whereof I affix my signature.

LAWRENCE O. BEARD.